United States Patent
Okado

(10) Patent No.: US 10,209,478 B2
(45) Date of Patent: Feb. 19, 2019

(54) FILTER UNIT

(71) Applicant: Kenko Tokina Co., Ltd., Tokyo (JP)

(72) Inventor: Eiji Okado, Tokyo (JP)

(73) Assignee: Kenko Tokina Co., Ltd., Tokyo (JP)

( * ) Notice: Subject to any disclaimer, the term of this patent is extended or adjusted under 35 U.S.C. 154(b) by 0 days.

(21) Appl. No.: 15/508,250

(22) PCT Filed: Sep. 7, 2015

(86) PCT No.: PCT/JP2015/004531
§ 371 (c)(1),
(2) Date: Mar. 2, 2017

(87) PCT Pub. No.: WO2016/038874
PCT Pub. Date: Mar. 17, 2016

(65) Prior Publication Data
US 2017/0261719 A1    Sep. 14, 2017

(30) Foreign Application Priority Data

Sep. 8, 2014   (JP) .................................. 2014-182111

(51) Int. Cl.
   *G02B 7/00*   (2006.01)
   *G03B 11/00*  (2006.01)
   *H04N 5/225*  (2006.01)

(52) U.S. Cl.
   CPC .............. *G02B 7/006* (2013.01); *G03B 11/00* (2013.01); *H04N 5/2254* (2013.01)

(58) Field of Classification Search
   CPC ............................. G02B 7/006; H04N 5/2254
   See application file for complete search history.

(56) References Cited

U.S. PATENT DOCUMENTS

2002/0006687 A1*  1/2002  Lam .................. H01L 27/14618
                                                            438/118
2006/0145325 A1*  7/2006  Yang ................. H01L 27/14618
                                                            257/680
(Continued)

FOREIGN PATENT DOCUMENTS

JP         50-025538 U1    3/1975
JP         50-138930 U1    11/1975
(Continued)

OTHER PUBLICATIONS

International Search Report for PCT/JP2015/004531, dated Dec. 8, 2015.
(Continued)

*Primary Examiner* — Amy R Hsu
(74) *Attorney, Agent, or Firm* — Sughrue Mion, PLLC

(57) ABSTRACT

A filter unit that is used by being detachably mounted on a lens barrel constituting an imaging device is configured so as to include a discoidal filter body, an annular filter frame that receives the filter body, an adhesion film that is formed between the filter frame and the filter body and that is formed of an elastic adhesion, and a decorative annular frame received at a portion that is inside the filter frame and that is, when mounted on the lens barrel, on the imaging object side with respect to the filter body. The filter body and the filter frame are in noncontact with each other by forming the adhesion film between the filter frame and the filter body, and by disposing the decorative annular frame, the adhesion film is hidden under the appearance of the filter unit when the filter unit is mounted on the lens barrel.

8 Claims, 7 Drawing Sheets

(56) References Cited

U.S. PATENT DOCUMENTS

| | | | | |
|---|---|---|---|---|
| 2006/0243884 A1* | 11/2006 | Onodera | ............ | H04N 5/2253 |
| | | | | 250/208.1 |
| 2010/0111519 A1* | 5/2010 | Kobayashi | ............ | G03B 11/00 |
| | | | | 396/544 |
| 2012/0099198 A1* | 4/2012 | Sunaga | ............ | B06B 1/02 |
| | | | | 359/508 |
| 2016/0216474 A1* | 7/2016 | Kobayashi | ............ | G03B 11/00 |

FOREIGN PATENT DOCUMENTS

| | | | | | |
|---|---|---|---|---|---|
| JP | 56-33630 | A | | 4/1981 | |
| JP | 08-271775 | A | | 10/1996 | |
| JP | 11-174298 | A | | 7/1999 | |
| JP | 2003-005005 | A | | 1/2003 | |
| JP | 2004-264555 | A | | 9/2004 | |
| JP | 2005-236830 | A | | 9/2005 | |
| JP | 2006-173248 | A | | 6/2006 | |
| JP | 2006-190956 | A | | 7/2006 | |
| JP | 2009-110248 | A | | 5/2009 | |
| JP | 2010-113016 | A | | 5/2010 | |
| JP | 4504001 | B2 | | 7/2010 | |
| JP | 2013-020018 | A | | 1/2013 | |
| JP | 2013-156483 | A | | 8/2013 | |
| JP | 2016181011 | A | * | 10/2016 | ............ G03B 11/00 |
| JP | 2016181011 | A | * | 10/2016 | ............ G03B 11/00 |

OTHER PUBLICATIONS

Communication dated Jan. 9, 2018, from the Japanese Patent Office in counterpart application No. 2014-182111.
Communication dated Oct. 2, 2018 from the Japanese Patent Office in counterpart Application No. 2014-182111.

* cited by examiner

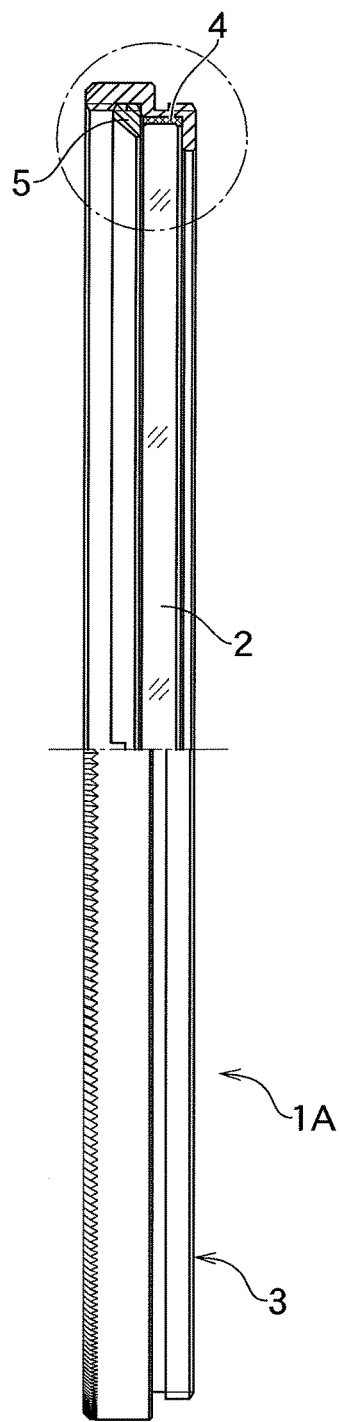
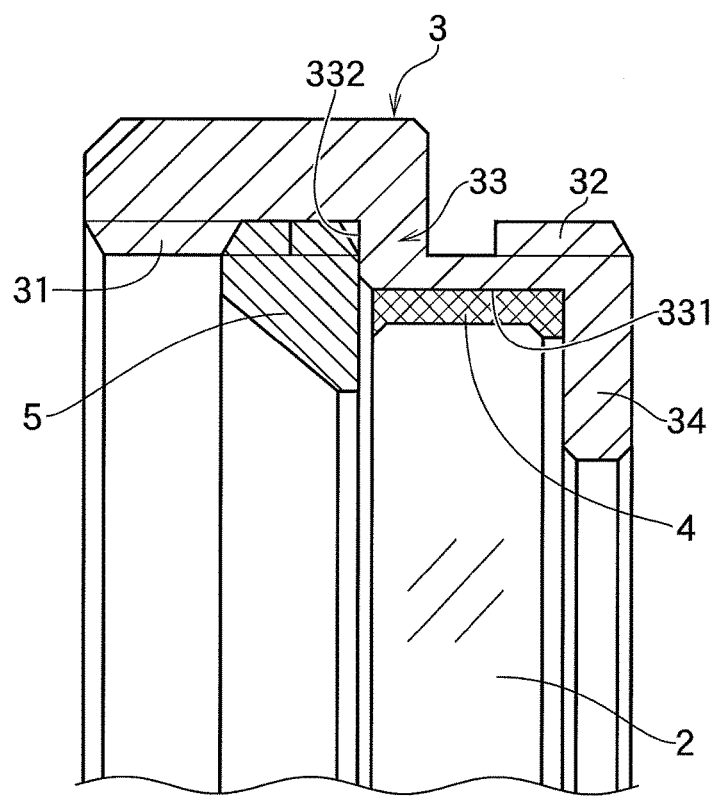

FIG.3(a)
FIG.3(b)
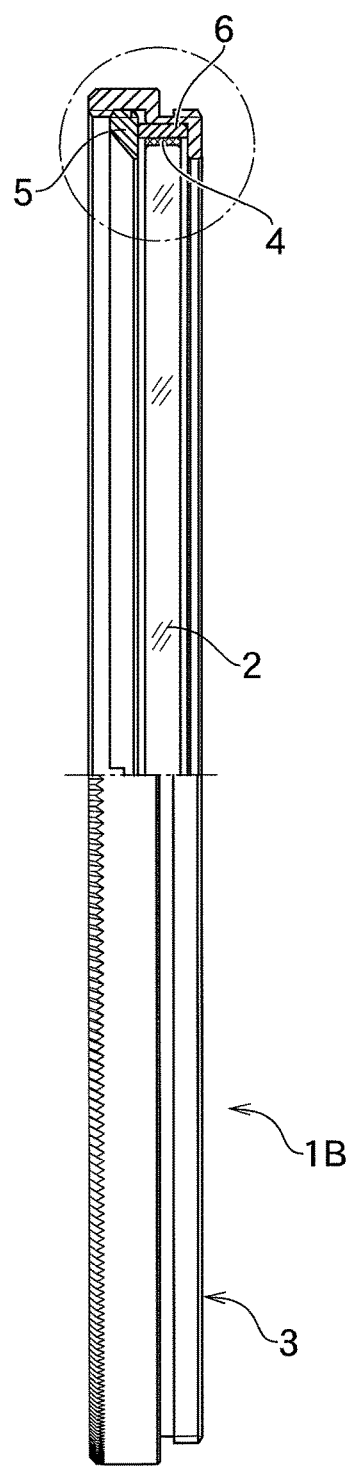
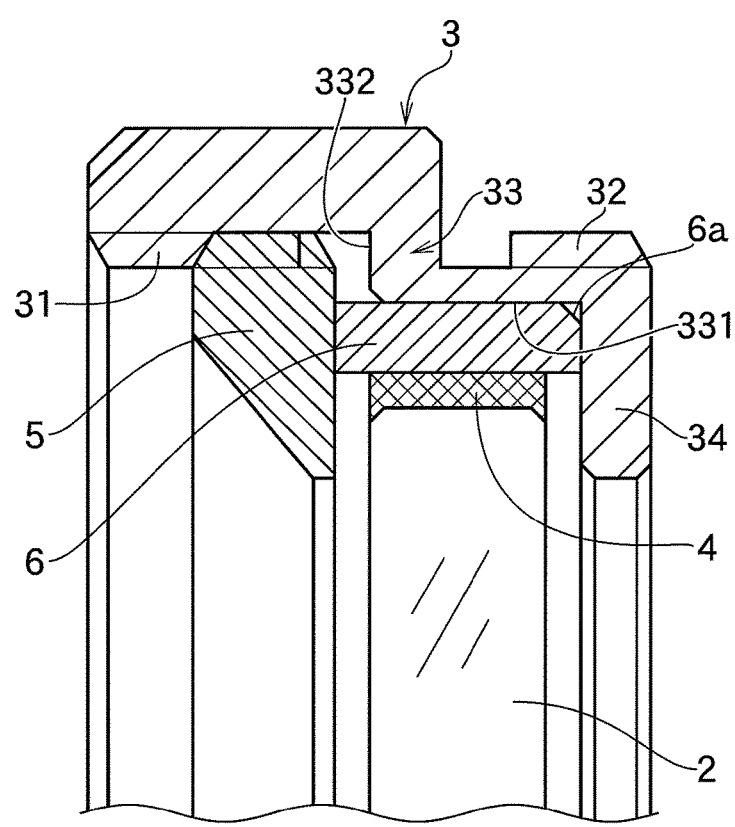

FILTER UNIT

CROSS REFERENCE TO RELATED APPLICATIONS

This is a National Stage of International Application No. PCT/JP2015/004531 filed Sep. 7, 2015 (claiming priority based on Japanese Patent Application No. 2014-182111 filed Sep. 8, 2014), the contents of which are incorporated herein by reference in their entirety.

TECHNICAL FIELD

The present invention relates to a filer unit that is a member used in an imaging device such as a digital still camera, a digital video camera, and the like, and relates to a filter unit in which a filter body is attached to a filter frame without performing any press fitting or pressing so that no distortion occurs in the filter body.

BACKGROUND ART

In imaging devices, such as digital cameras, it is typical to mount a filter unit on a lens barrel with the object of using the filter unit as a protector that protects the front surface of the lens from dirt and scratches or to, for example, polarize or reduce the light. A conventional filter unit, for example, is configured by fixing a discoidal glass filter body inside an annular filter frame body. Note that the annular filter frame body is configured such that a male screw portion for attaching a lens barrel is formed on one end side, and a female screw portion for attaching another lens related component is formed on the other end side.

In many cases, the filter frame body is attached to the filter body by, as proposed in PTL 1 described below, performing fixing with a presser ring or a C-ring after directly dropping the filter body in an inner surface of the filter frame. Furthermore, as proposed in PTL 2, in some cases, fixing is performed by caulking. In other words, the filter unit is made while the filter frame body and the filter body are in pressure contact with each other. Moreover, an example in which the filter frame is configured of polymeric elastomer is proposed in PTL 3. Since fixing is performed by a method such as thermal caulking, ultrasonic bonding, adhesion, or the like, it is considered that the filter frame body and the filter body are in a state of pressure contact with each other.

In recent years, in the technical field related to digital cameras, application of solid-state image sensing devices with a high-resolution performance such as 4K (horizontal resolution 4096 pixels×vertical resolution 2160 pixels), and further 8K (horizontal resolution 7680 pixels×vertical resolution 4320 pixels) are being considered. However, as in the filter units proposed in PTLs 1 to 3, when the filter unit is configured in a state in which the filter frame body and the filter body are in pressure contact with each other, there is a concern of a distortion occurring on the surface of the filter body. In such a case, if a 4K or an 8K solid-state image sensing device is used, there is a concern of deterioration in image caused by distortion in the surface of the filter.

In the invention described in PTL 4 described below, a technique is proposed that attempts to fix the lens to the barrel with an elastic adhesive. In the invention described in PTL 5 described below, a technique is proposed that prevents a center deviation from occurring after a light source and a light source holder are attached to each other by fixing the light source holder constituting a light source unit and an auxiliary member that is integral with a light source to each other with an elastic adhesive. As described above, in PTLs 4 and 5, inventions have been proposed that focus on relieving the distortion that occurs by contact between different members. Other than the above, a filter unit that is disclosed in PTL 6 has been proposed.

CITATION LIST

Patent Literature

PTL 1: Microfilm of Japanese Utility Model Registration Application No. 49-49857 (Japanese Unexamined Utility Model Registration Application Publication No. 50-138930)
PTL 2: Microfilm of Japanese Utility Model Registration Application No. 48-78397 (Japanese Unexamined Utility Model Registration Application Publication No. 50-25538)
PTL 3: Japanese Unexamined Patent Application Publication No. 2013-156483
PTL 4: Japanese Unexamined Patent Application Publication No. 8-271775
PTL 5: Japanese Patent No. 4504001
PTL 6: Japanese Unexamined Patent Application Publication No. 2003-5005

SUMMARY OF INVENTION

Technical Problem

However, when the elastic adhesive constituting the invention proposed in PTL 4 is applied to the filter unit, an extrusion of the adhesive occurs; accordingly, processes to cope with the above are needed and the number of processes increases leading to a concern of increase in the manufacturing cost and the like. Furthermore, there is a large possibility that the prevention of distortion in the lens, the filter body, and the like will be insufficient when the lens is fixed to the barrel with an elastic adhesive. Furthermore, the invention proposed in PTL 5 has a problem in that application itself of the technique according to the invention to the filter unit is difficult.

The present invention has been proposed in view of the above circumstances and relates to a filter unit that is a member used in an imaging device. An object of the invention is to provide a filter unit that is configured by attaching a filter body to the filter frame without any distortion occurring in the filter body, and that is configured such that a problem caused by the distortion of the filter body does not occur so that a high definition image can be obtained with a digital camera and the like.

Solution to Problem

In order to achieve the above object, a filter unit that is a member used in an imaging device includes a discoidal or a polygonal plate-shaped filter body, a filter frame that receives the filter body, and an adhesion film that is formed between the filter frame and the filter body and that is formed of an elastic adhesive. In the filter unit, the filter body is made to be in noncontact with the filter frame with the adhesion film, and when the filter unit is mounted on the imaging device, the adhesion film is hidden under the appearance of the filter unit.

Furthermore, the present invention is a filter unit that is a member used in an imaging device including a discoidal or a polygonal plate-shaped filter body, an intermediate frame body that receives the filter body, an adhesive film that is formed between the intermediate frame body and the filter body and that is formed of an elastic adhesion, and a filter frame that holds the intermediate frame body. In the filter unit, the filter body is made to be in noncontact with the filter frame with the intermediate frame body, the filter body is made to be in noncontact with the intermediate frame body with the adhesion film, and when the filter unit is mounted on the imaging device, the adhesion film is hidden under an appearance of the filter unit.

Particularly, in the above filter units, it is preferable that the adhesion film be black colored and, more preferably, include a sealing member that is fitted in the filter frame.

Advantageous Effects of Invention

The filter unit according to the present invention is configured such that the filter body is in noncontact with the filter frame with the adhesion film, and when the filter unit is mounted on a lens barrel, for example, that constitutes the imaging device, the adhesion film is hidden under the appearance of the filter unit. Since the filter body is in noncontact with the filter frame, the filter unit can be made by attaching the filter body to the filter frame without, for example, press fitting the filter body. In other words, the filter unit can be made by attaching the filter body to the filter frame without causing any distortion. Furthermore, in the present invention, since the adhesion film is hidden under the appearance of the filter unit, the adhesion film does not affect the image and the like that are taken. Accordingly, it is possible to provide a filter unit that does not cause any problem caused by the distortion of the filter body and that obtains an image having high definition with a digital camera and the like, and a filter unit in which there is no adverse effect exerted by the adhesion film newly introduced in the present invention.

Another filter unit according to the present invention is configured such that the filter body is in noncontact with both the intermediate frame body and the filter frame and, for example, when the filter unit is mounted on a lens barrel, the adhesion film is hidden under the appearance of the filter unit. Since the filter body is in noncontact with both the intermediate frame body and the filter frame, the filter unit can be made by attaching the filter body to the filter frame without, for example, press fitting the filter body. In other words, the filter unit can be made by attaching the filter body to the filter frame without causing any distortion. Furthermore, since the adhesion film is hidden under the appearance of the filter unit, the adhesion film does not affect the image and the like that are taken. Accordingly, a filter unit that does not cause any problem caused by the distortion of the filter body and that obtains an image having high definition with a digital camera and the like, and a filter unit in which there is no adverse effect exerted by the adhesion film newly introduced in the present invention can be provided. Furthermore, in a case in which the filter body becomes damaged, since it is only sufficient to replace the member including the filter body, the intermediate frame body, and the adhesion film therebetween while making use of the filter frame, it is more economical than totally replacing the filter unit.

Furthermore, in the filter unit, by configuring the adhesion film to be black in color, the adhesion film can be prevented from reflecting a light, which is passing through the filter unit, in a diffused manner and can be prevented from interfering with the light. Furthermore, by including the sealing member that fits in the filter frame, air-tightness is obtained such that, for example, various effects owing to air-tightness, such as a waterproof effect, can be obtained.

BRIEF DESCRIPTION OF DRAWINGS

FIGS. 1(a) and 1(b) illustrate a configuration of a filter unit according to a first embodiment of the present invention, in which FIG. 1(a) is a schematic and partial cross-section thereof and FIG. 1(b) is an enlarged view of the dot and dash line portion in the partial cross-section in FIG. 1(a).

FIGS. 2(a) and 2(b) illustrate a manufacturing process of the filter unit according to the first embodiment, in which FIG. 2(a) is a vertically sectioned explanatory drawing and FIG. 2(b) is an enlarged view of the dot and dash line portion in FIG. 2(a).

FIGS. 3(a) and 3(b) illustrate a configuration of a filter unit according to a second embodiment of the present invention, in which FIG. 3(a) is a schematic and partial cross-section thereof and FIG. 3(b) is an enlarged view of the dot and dash line portion in the partial cross-section in FIG. 3(a).

FIGS. 4(a) and 4(b) illustrate a manufacturing process of the filter unit according to the second embodiment, in which FIG. 4(a) is a vertically sectioned explanatory drawing and FIG. 4(b) is an enlarged view of the dot and dash line portion in FIG. 4(a).

FIGS. 5(a) and 5(b) illustrate a configuration of a filter unit according to a third embodiment of the present invention, in which FIG. 5(a) is a schematic and partial cross-section thereof and FIG. 5(b) is an enlarged view of the dot and dash line portion in the partial cross-section in FIG. 5(a).

FIGS. 7(a) and 7(b) illustrate a configuration of a filter unit according to yet another embodiment of the present invention, in which FIG. 7(a) is a schematic front view thereof, and FIG. 7(b) is a cross-sectional view taken along VII-VII in FIG. 7(a).

DESCRIPTION OF EMBODIMENTS

Figure 2A:
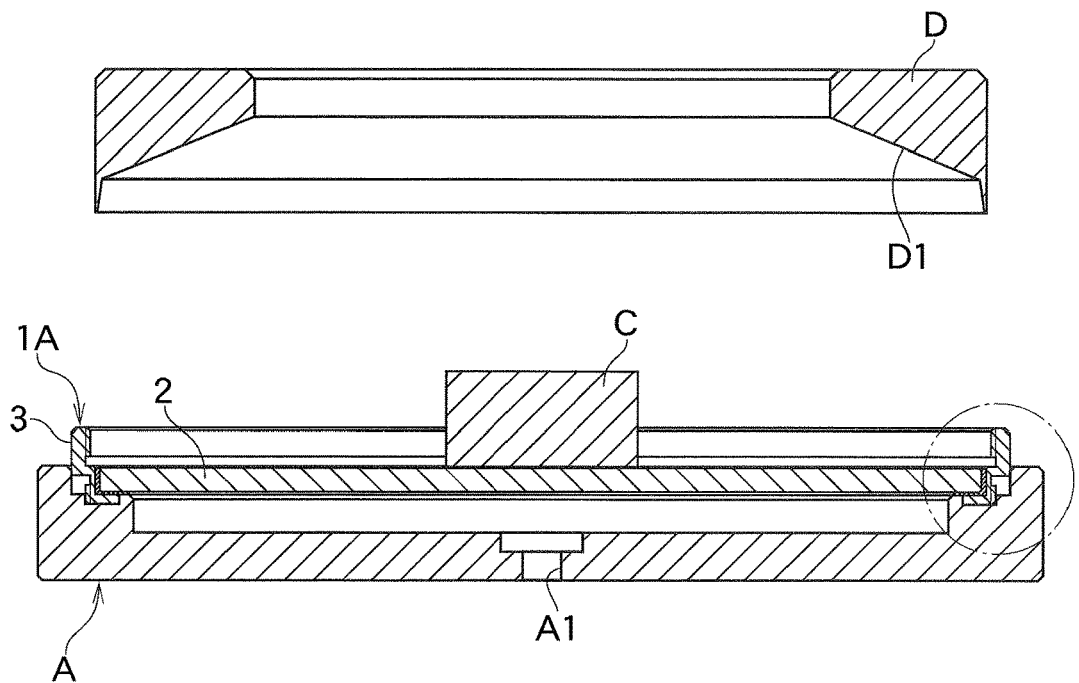

Hereinafter, some embodiments related to a filter unit of the present invention will be described in detail together with the drawings. The embodiments are some of the exemplifications included in the technical scope of the present invention. Accordingly, the present invention is not limited to the configurations of the filter unit described in the embodiments, and various design modifications can be made within the technical scope of the invention.

First Embodiment

A filter unit 1A according to a first embodiment is, for example, used by being detachably mounted on a lens barrel (not shown) constituting an imaging device, such as a digital camera. As illustrated in FIGS. 1(a) and 1(b), a configuration of the filter unit 1A includes a discoidal filter body 2, an annular filter frame 3 that receives the filter body 2, and an adhesion film 4 that is formed between the filter frame 3 and the filter body 2 and that is formed of an elastic adhesion. Furthermore, the filter unit 1A is configured so as to include a decorative annular frame 5 received at a portion that is inside the filter frame 3 and that is, when mounted on the lens barrel, on the imaging object side with respect to the filter body 2. Since the adhesion film 4 is formed between the filter frame 3 and the filter body 2, the filter body 2 is in noncontact with the filter frame 3. Furthermore, when the filter unit 1A is mounted on the lens barrel, the adhesion film 4 is hidden under the appearance of the filter unit 1A owing to the disposition of the decorative annular frame 5.

A material of the filter body 2 is glass, plastic, gelatin, acetate, or the like that includes a component that protects the front surface of the lens, or that gives various effects, such as polarization, a reduction in light, sharp-cut (shielding a wavelength that is equal to or shorter than a specific wavelength) on the light passing through the filter body 2. For example, an example of the filter body 2 may be a filter body 2 formed of a piece of optical glass, such as a piece of borosilicate glass. Furthermore, for example, an example of the filter body 2 may be a filter body 2 formed of a single plate of glass that has been precision polished and that has a high profile irregularity. An outside diameter D of the filter body 2 is, 127 mm or less, and a thickness thereof is, for example, 2.5 mm. In particular, a case in which the filter body is formed of glass is more favorable for making the taken image have a high picture quality since the filter body becomes less dependent on the environment (the temperature, for example). For example, the coefficient of thermal expansion of borosilicate glass is $5.2 \times 10^{-6\circ}$ C., which is a value that is ten times or more lower than the coefficient of thermal expansion ($7 \times 10^{-5\circ}$ C.) of plastic (PC, for example).

The filter frame 3 includes a female screw portion (a first engagement portion) 31 that is formed on an inner peripheral side of one end side and in which various optical components are mounted, and a male screw portion (a second engagement portion) 32 that is formed on an outer peripheral side of the other end side and that is mounted in the lens barrel. Furthermore, a step portion 33 is formed in a portion between where the female screw portion 31 and the male screw portion 32 are formed. An end portion on the male screw portion 32 side is a smallest diameter portion 34 that has the smallest annulus diameter in the filter frame 3. Furthermore, the filter body 2 is received in a space formed by the smallest diameter portion 34 and an inner surface side 331 of the step portion 33. The filter frame 3 can be formed of a hard material such as, for example, an aluminum alloy, that has a mechanical strength large enough for the filter frame 3 not to become bent when mounted and that has a small specific gravity, or can be formed of a polymeric material, such as an engineering plastic.

An adhesion film that is formed of an adhesion having elasticity (an elastic adhesive), that has rubber elasticity after the film has been cured, and that is capable of dispersing stress with the film is employed as the adhesion film 4 formed between the filter frame 3 and the filter body 2. In particular, from the point of environmental pollution, a solventless type one-part moisture-curing adhesive composition is preferably used. An example of the elastic adhesive constituting such an adhesion film 4 may include an adhesive that is a mixture of silicone resin, silicone-modified resin, silylated urethane resin, polyurethane resin, or the like serving as a base polymer and, as required, one or more kinds of a filler (calcium carbonate, for example), a plasticizer (phthalate ester, for example), and an adhesion improver (aminosilane coupling agent, for example). In the silicone-modified resin that includes an alkoxysilyl group at a terminal of a polypropylene glycol skeleton, the polypropylene glycol skeleton exerts elasticity. Furthermore, in the presence of a catalyst, by having the alkoxysilyl group at the terminal go through a condensation reaction with water and form a crosslink, an adhesion film (a hardened material) that has a high coefficient of extension of 50 to 400% is obtained, silicone-modified resin can be noted as a preferable material for the base polymer.

Furthermore, when the adhesion film 4 is an adhesion film having the silicone-modified resin as the base polymer, since the glass transition point of the hardened material is about $-50°$ C., a rubber-like elasticity is exhibited in the normal use state. Since an elastic adhesive having silicone-modified resin as the base polymer is liquid at normal temperatures, the elastic adhesive is a solventless type adhesive, and since infiltration of water is blocked even in the presence of a curing catalyst, the elastic adhesive is a one-part adhesive. In the present invention, when the adhesion film 4 is configured using a black elastic adhesive in paste form, since the light incident on the filter body 2 will not be reflected in a diffused manner in the adhesion film 4, diffused reflection of light inside the filter unit 1A can be prevented.

When the decorative annular frame 5 inside the filter frame 3 is mounted on the lens barrel, the decorative annular frame 5 is received at a portion that is on the imaging object side with respect to the filter body 2. In particular, by abutting against a wide side 332 of the step portion 33 of the filter frame 3, the decorative annular frame 5 is received on the imaging object side with respect to the filter body 2, which is received on the inner surface side 331 of the step portion 33 of the filter frame 3 with the adhesion film 4 in between, while being separated from the filter body 2 with a predetermined space in between. With the above, the decorative annular frame 5 and the filter body 2 are structured so as to be in noncontact with each other. Similar to the filter frame 3, the decorative annular frame 5 can be formed of a hard material such as, for example, an aluminum alloy, that has a mechanical strength large enough for the filter frame 3 not to become bent when mounted and that has a small specific gravity, or can be formed of a polymeric material, such as an engineering plastic.

The filter unit 1A according to the first embodiment can be assembled and configured by using a jig or the like that is illustrated in FIG. 2, for example.

Figure 2B:
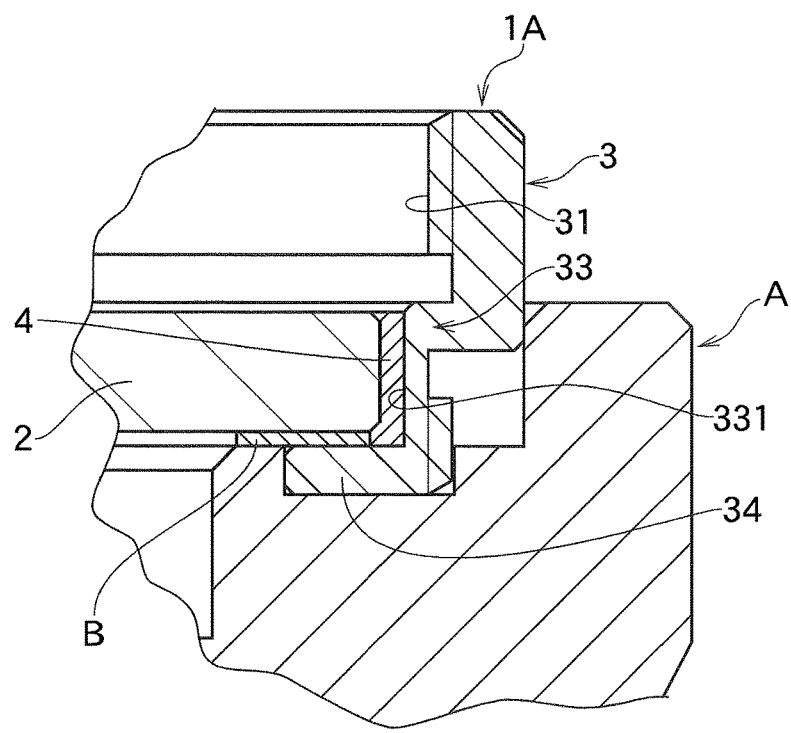

In other words, as illustrated in FIGS. 2(a) and 2(b), the filter frame 3 is mounted, with the female screw portion 31 side on the upper side, on a circular flat surface-shaped holding jig A, on a desk robot, formed with a center hole A1. Subsequently, the filter body 2 is accommodated on the inner surface side 331 of the step portion 33 of the filter frame 3. In so doing, an adhesive release sheet B is disposed in advance in the smallest diameter portion 34 of the filter frame 3, and the filter frame 3 is dropped thereon. Note that the adhesive release sheet B is a sheet material for preventing the elastic adhesive from leaking to the outside from the smallest diameter portion 34 of the filter frame 3 when the adhesion film 4 is, as described later, formed by applying an elastic adhesive between the filter body 2 and the filter frame 3 and by curing the elastic adhesive.

Furthermore, after the filter body 2 is accommodated on the inner surface side 331 of the step portion 33 of the filter frame 3, a weight C is placed on the filter body 2 to add weight to the filter body 2 so that the filter body 2 does not move easily. Furthermore, the center position of the filter body 2 is determined by inserting an end portion of a centering jig D between the filter body 2 and the filter frame 3 from above such that the holding jig A is covered. A recessed shape (a truncated cone shape) D1 is formed on the bottom surface side of the centering jig D such that the centering jig D covering the holding jig A do not come in contact with the filter body 2.

The centering jig D is removed after the position of the center of the filter body 2 is set, and the adhesion film 4 is formed by applying a black elastic adhesive (for example, an elastic adhesive including a coloring agent (a black pigment, for example) and in which a silicone-modified resin is the base polymer) between the filter body 2 and the filter frame 3, and by leaving the above for a predetermined time and curing the elastic adhesive. With the above, a filter unit 1A can be made in which the filter body 2 and the filter frame 3 are made to be in noncontact with each other with the adhesion film 4. Note that the material of the holding jig A is, preferably, polyacetal resin (POM), polypropylene resin (PP), fluororesin (PTFE, for example), polyamide resin (nylon), or the like that does not become completely adhered even when the elastic adhesive adheres thereto and that can be detached. Furthermore, since assembling of the filter unit 1A is proceeded while the filter body 2 is floating in a reliable manner over the holding jig A, preferably, a washer (a spacer having shape of a flat washer) or the like formed of a material that does not become completely adhered even when the elastic adhesive adheres thereto is inserted in the filter frame 3 after the filter frame 3 is mounted on the holding jig A.

The assembling of the filter unit 1A is completed by abutting the decorative annular frame 5 against the wide side 332 of the step portion 33 from the female screw portion 31 side of the filter frame 3 and receiving the decorative annular frame 5 in the filter frame 3. Since the cured adhesion film 4 is elastic and exhibits rubber elasticity, concentration of stress to the adhesive interface is prevented.

The application quantity of the elastic adhesive forming the adhesion film 4 can be determined by the required thickness of the adhesion film 4. In other words, it is not preferable that the film thickness of the adhesion film 4 is too small since the elasticity of the adhesion film 4 is hindered and the adhesive strength is decreased, and it is not preferable that the film thickness is too large since the accuracy in mounting the filter body 2 is decreased; accordingly, an appropriate thickness is required. For example, the thickness of the adhesion film 4 is preferably in the range of 0.2 to 0.8 mm and, more preferably, is in the range of 0.5 to 0.6 mm.

Second Embodiment

As illustrated in FIGS. 3(a) and 3(b), a filter unit 1B according to a second embodiment includes a discoidal filter body 2, an inner frame 6 serving as an annular intermediate frame body that receives the filter body 2, an adhesion film 4 that is formed between the inner frame 6 and the filter body 2 and that is formed of an elastic adhesive, and an annular filter frame 3 that holds the inner frame 6. Furthermore, the filter unit 1B is configured so as to include a decorative annular frame 5 received at a portion that is inside the filter frame 3 and that is, when mounted on the lens barrel, on the imaging object side with respect to the filter body 2.

Owing to the inner frame 6, the filter body 2 is in noncontact with the filter frame 3. Since the adhesion film 4 is formed between the inner frame 6 and the filter body 2, the filter body 2 is in noncontact with the inner frame 6 as well. Furthermore, when the filter unit 1A is mounted on the lens barrel, the adhesion film 4 is hidden under the appearance of the filter unit 1A owing to the disposition of the decorative annular frame 5.

In the filter unit 1B according to the second embodiment, the filter body 2, the filter frame 3, the adhesion film 4, and the decorative annular frame 5 may adopt configurations that are similar to those of the first embodiment. The filter unit 1B according to the second embodiment is different from that of the first embodiment in that the annular inner frame 6 is added. Note that the outside diameter of the filter body 2 may be smaller in diameter by the dimension equivalent to the added inner frame 6.

As illustrated in FIG. 3, the inner frame 6 has an annular shape and receives the filter body 2 via the adhesion film 4 formed therebetween. Furthermore, the inner frame 6 is received on an inner surface side 331 of a step portion 33 of the filter frame 3. An end portion of the inner frame 6 abuts against the decorative annular frame 5 that has been received from a female screw portion 31 side of the filter frame 3. With the above, the filter body 2 and the decorative annular frame 5 are structured so as to be in noncontact with each other.

Similar to the filter frame 3 and the decorative annular frame 5, the inner frame 6 can be formed of a hard material such as, for example, an aluminum alloy, that has a mechanical strength large enough for the filter frame 3 not to become bent when mounted and that has a small specific gravity, or can be formed of a polymeric material, such as an engineering plastic.

The filter unit 1B according to the second embodiment can be assembled and configured by using a jig or the like that is illustrated in FIG. 4, for example.

Figure 4A:
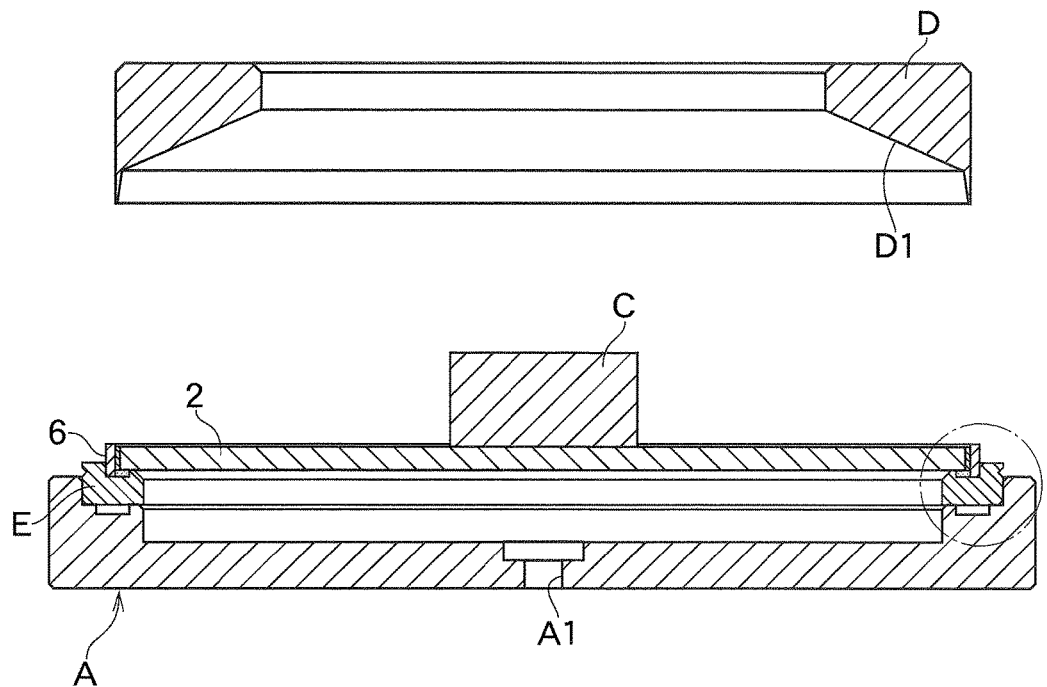
Figure 4B:
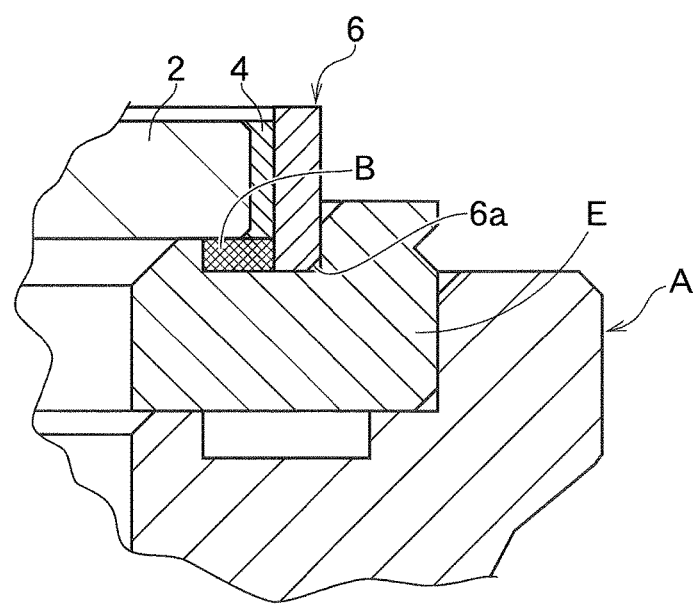

In other words, as illustrated in FIGS. 4(a) and 4(b), an annular jig E for the inner frame is mounted on a circular flat surface-shaped holding jig A, on a desk robot, formed with a center hole A1. Subsequently, the inner frame 6 is mounted on an annulus of the jig E for the inner frame. In so doing, by providing a chamber 6a in the inner frame 6 and by setting the chamfer 6a on the jig E for the inner frame side, the orientation of the inner frame 6 can be determined. The filter body 2 is accommodated on the inner surface of the inner frame 6. In so doing, an adhesive release sheet B is disposed in advance in the jig E for the inner frame and on the chamfer 6a side of the inner frame 6, and the filter body 2 is dropped thereon. Note that as described above, the adhesive release sheet B is a sheet material for preventing the elastic adhesive from leaking to the outside from the inner frame 6 when the adhesion film 4 is formed.

After the filter body 2 is accommodated on the inner surface of the inner frame 6, a weight C is placed on the filter body 2 to add weight to the filter body 2 so that the filter body 2 does not move easily. Furthermore, the center position of the filter body 2 is determined by inserting an end portion of a centering jig D between the filter body 2 and the inner frame 6 from above such that the jig E for the inner frame is covered. The centering jig D is prevented from coming in contact with the filter body 2 with the recessed shape D1 on the bottom surface side of the centering jig D.

The centering jig D is removed after the position of the center of the filter body 2 is set, and the adhesion film 4 is formed by applying a black elastic adhesive (for example, an elastic adhesive including a coloring agent (a black pigment, for example) and in which a silicone-modified resin is the base polymer) between the filter body 2 and the inner frame 6, and by leaving the above for a predetermined time and curing the elastic adhesive. With the above, due to the adhesion film 4, the filter body 2 is in noncontact with the inner frame 6. Last of all, the filter unit 1B can be made by fitting and accommodating a portion in which the adhesion film 4 is formed between the filter body 2 and the inner frame 6 in the inner surface side 331 of the step portion 33 of the filter frame 3. Furthermore, the assembling of the filter unit 1B is completed by abutting the decorative annular frame 5 against the inner frame 6 from the female screw portion 31 side of the filter frame 3 and receiving the decorative annular frame 5 in the filter frame 3.

Since the cured adhesion film 4 is elastic and exhibits rubber elasticity, concentration of stress to the adhesive interface is prevented. In the filter unit 1B according to the second embodiment, in a case in which the filter body 2 becomes damaged, all one needs to do is to replace the portion in which the adhesion film 4 is formed between the filter body 2 and the inner frame 6 without replacing the filter frame 3; accordingly, it is more economical than performing total replacement.

Note that in the second embodiment as well, the application quantity of the elastic adhesive forming the adhesion film 4 is determined by the required thickness of the adhesion film 4. In other words, the thickness is determined at a thickness in which the elasticity of the adhesion film 4 is not hindered, in which the adhesion strength does not decrease, and in which the accuracy in mounting the filter body 2 is not lowered. For example, the thickness of the adhesion film 4 is preferably in the range of 0.2 to 0.8 mm and, more preferably, is in the range of 0.5 to 0.6 mm.

Third Embodiment

Figure 5A:
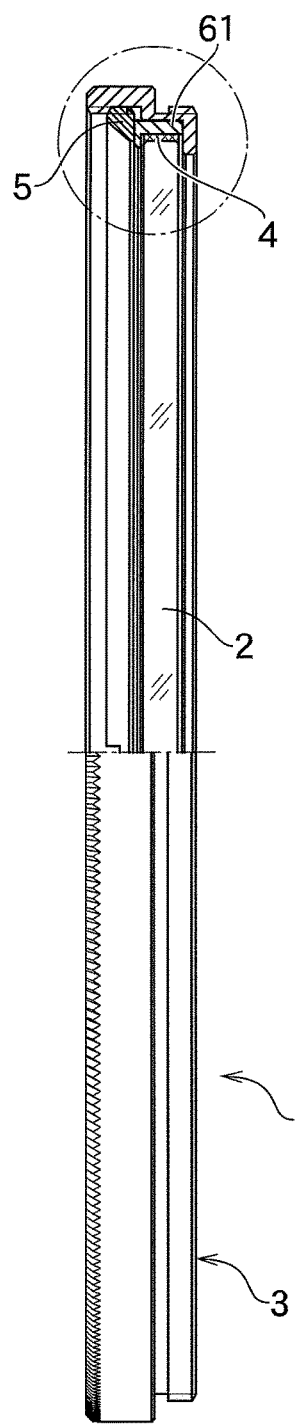
Figure 5B:
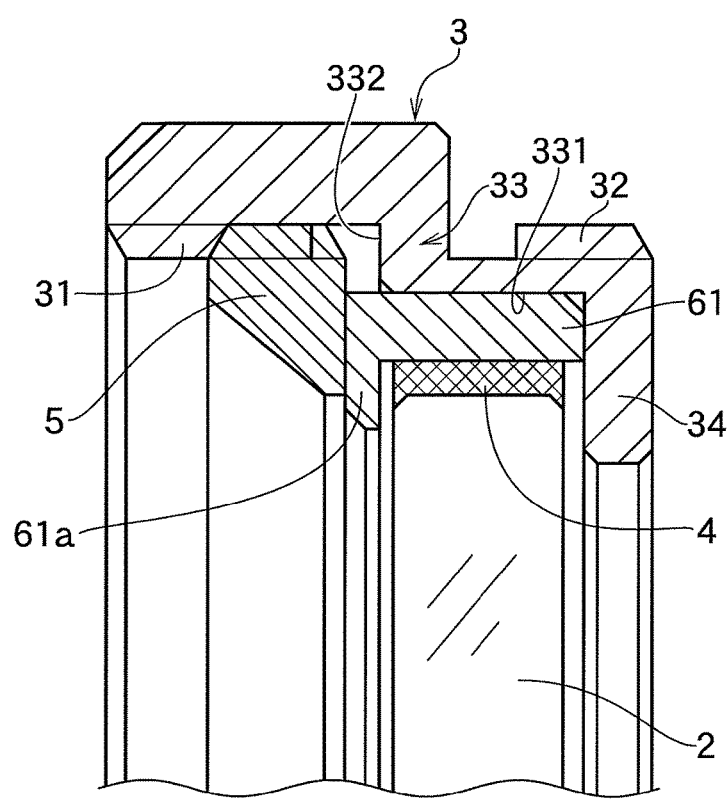

Furthermore, in the present invention, a filter unit 1C according to a third embodiment, such as the one illustrated in FIGS. 5(a) and 5(b), is also included in the technical scope of the present application. In other words, the filter unit 1C according to the third embodiment includes a discoidal filter body 2, an inner frame 61 serving as an annular intermediate frame body receiving the filter body 2, an adhesion film 4 that is formed between the inner frame 61 and the filter body 2 and that is formed of an elastic adhesive, and an annular filter frame 3 that holds the inner frame 6. Furthermore, the filter unit 1C is configured so as to include a decorative annular frame 5 received at a portion that is inside the filter frame 3 and that is, when mounted on the lens barrel, on the imaging object side with respect to the filter body 2.

The inner frame 61 constituting the filter unit 1C according to the third embodiment is different from the inner frame 6 of the filter unit 1B of the second embodiment in that, as illustrated particularly in FIG. 5(b), the inner frame 61 includes a structure that has a substantially L-shaped cross section in which an abutment surface 61a is formed on the side on which the decorative annular frame 5 abuts against and that ensures contact with the decorative annular frame 5. Other than above is similar to the filter unit 1B according to the second embodiment.

Accordingly, while noting that the inner frame 61 is mounted on the annulus of the jig E for the inner frame with the chamfer 6a provided in the inner frame 61 positioned on the upper side that is a side opposite to the jig E for the inner frame (having the abutment surface 61a on the jig E for the inner frame side), the assembling of the filter unit 1C according to the third embodiment is similar to that of the filter unit 1B according to the second embodiment. Furthermore, the filter unit 1C according to the third embodiment can ensure contact with the decorative annular frame 5 and configure the entirety to be robust.

Other Embodiments

Figure 6:
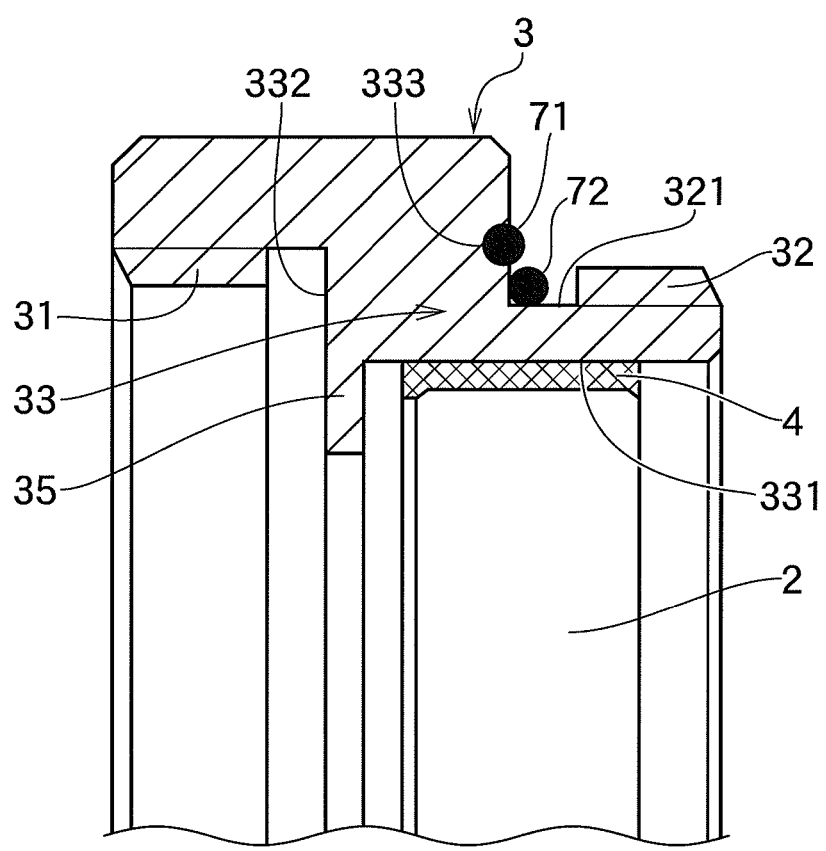
FIG. 6 is an essential-portion enlarged view illustrating an enlarged essential portion for showing a configuration of a filter unit according to another embodiment of the present invention.

Furthermore, the present invention also includes, in the technical scope of the present application, a filter unit illustrated in FIG. 6. In other words, it is preferable that the filter unit be configured so that the filter frame 3 includes packings 71 and 72 (sealing members), a representative example of which is a rubber O-ring. The above is because, when mounting is performed by screwing in the lens barrel, air-tightness is obtained such that, for example, various effects owing to air-tightness, such as a waterproof effect, can be obtained.

Note that the packing that is included in the filter frame 3 may be either of the packing 71 that is fitted into a groove 333 formed in the step portion 33, and the packing 72 disposed in a screw clearance portion 321 in a continuous manner in a male screw portion 32 of the filter frame 3. In either case, air-tightness can be obtained when mounting is performed by screwing in the lens barrel.

Furthermore, as illustrated in FIG. 6, the filter unit may be configured such that a decorative portion 35 that protrudes inward is provided in the filter frame 3, and that the decorative portion 35 functions as a decorative annular frame so that the adhesion film 4 does not appear in the appearance. Since the decorative annular frame is not needed, an economical filter unit can be provided.

While one of the embodiments that the applicants believe to be the best mode of the present invention has been described above in detail, the present invention is not limited to the embodiment described above and various modifications in design can be made that does not depart from the matter stated in the Claims. For example, regarding the members, the components, and the like that is required in constituting the present invention, members, components, and the like other than those exemplified may be employed as long as the members, the components, and the like exert the effects that can be obtained by the present invention.

Figure 7A:
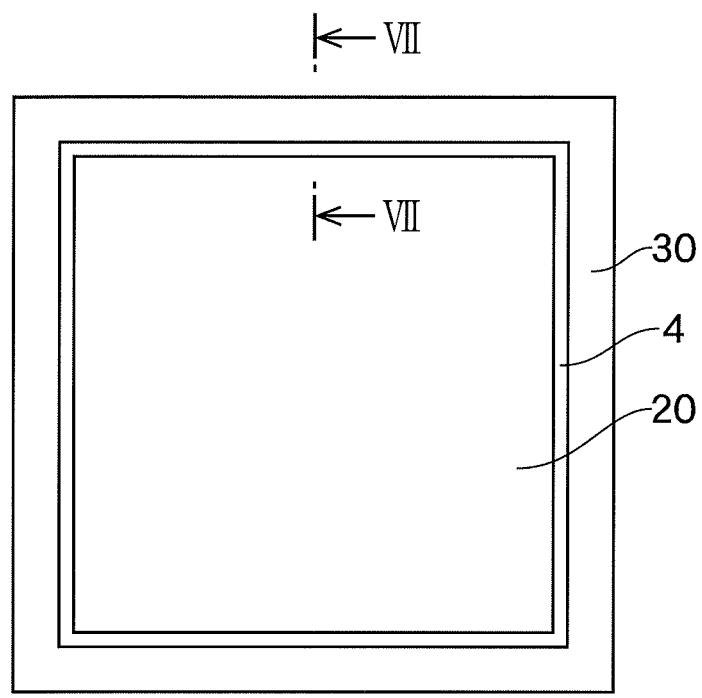
Figure 7B:
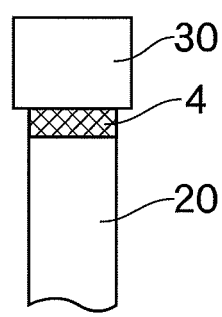

Moreover, for example, as illustrated in FIG. 7, the present invention also includes, in the technical scope of the present application, a rectangular filter unit. In other words, as illustrated in FIGS. 7(a) and 7(b), a configuration of the rectangular filter unit includes a polygonal plate-shaped filter body 20, a polygonal ring-shaped filter frame 30 that receives the filter body 20, and an adhesion film 4 that is formed between the filter frame 30 and the filter body 20 and that is formed of an elastic adhesive.

Since the adhesion film 4 is formed between the filter frame 30 and the filter body 20 in such a filter unit configured in the above manner, the filter body 20 is in noncontact with the filter frame 3. Accordingly, a filter unit can be made by attaching the filter body 20 to the filter frame 30 without causing any distortion.

Furthermore, while the filter unit having the above configuration is mounted in the lens barrel by being inserted into the holder provided in the lens barrel and the like, portions or the entire filter frame 30 and adhesion film 4 are hidden under the appearance with the holder.

Moreover, in the embodiments described above, a configuration has been exemplified in which the presser ring is disposed in the female screw portion on the front side (the side on which light is incident and that has a large outside diameter) of the filter frame. However, the present invention also includes, in the technical scope, a configuration in which, for example, a female screw portion is formed on an inner circumferential surface of a rear side (the side on which light is emitted and that has a small outside diameter) of a filter frame on which a male screw portion is formed on the outer circumferential surface, and in which a presser ring is disposed in the female screw portion to press down the filter body.

REFERENCE SIGNS LIST 1A filter unit (present invention: first embodiment)
1B filter unit (present invention: second embodiment)

1C filter unit (present invention: third embodiment)
2 filter body
20 filter body
3 filter frame
30 filter frame
31 female screw portion
32 male screw portion
321 screw clearance portion
33 step portion
331 inner surface side of step portion
332 wide side of step portion
333 groove
34 smallest diameter portion
35 decorative portion
4 adhesion film
5 decorative annular frame
6 inner frame (intermediate frame body: second embodiment)
6a chamfer
61 inner frame (intermediate frame body: third embodiment)
61a abutment surface
71 packing (sealing member)
72 packing (sealing member)
A holding jig
A1 center hole
B adhesive release sheet
C weight
D centering jig
D1 recessed shape (truncated cone shape)
E jig for inner frame

The invention claimed is:

1. A filter unit that is a member used in an imaging device, the filter unit comprising:
a discoidal or a polygonal plate-shaped filter body;
a filter frame that receives the filter body; and
an adhesion film that is formed between the filter frame and a side portion of the filter body and that is formed of an elastic adhesive,
wherein the filter body is made to be in noncontact with the filter frame with the adhesion film, and is configured not subject to pressing force from an outside and an inside of the filter body, and
wherein when the filter unit mounted on the imaging device, the adhesion film is hidden under an appearance of the filter unit.

2. A filter unit that is a member used in an imaging device, the filter unit comprising:
a discoidal or a polygonal plate-shaped filter body;
an intermediate frame body that receives the filter body;
an adhesion film that is formed between the intermediate frame body and the filter body and a side portion of that is formed of an elastic adhesive; and
a filter frame that holds the intermediate frame body,
wherein the filter body is made to be in noncontact with the filter frame with the intermediate frame body,
wherein the filter body is made to be in noncontact with the intermediate frame body with the adhesion film, and is configured not subject to pressing force from an outside and an inside of the filter body, and
wherein when the filter unit is mounted on the imaging device, the adhesion film is hidden under an appearance of the filter unit.

3. The filter unit according to claim 1,
wherein the adhesion film is black colored.

4. The filter unit according to claim 1, further comprising a sealing member fitted in the filter frame.

5. The filter unit according to claim 2,
wherein the adhesion film is black colored.

6. The filter unit according to claim 2, further comprising a sealing member fitted in the filter frame.

7. The filter unit according to claim 3, further comprising a sealing member fitted in the filter frame.

8. The filter unit according to claim 5, further comprising a sealing member fitted in the filter frame.

* * * * *